United States Patent
Tsukamoto et al.

(10) Patent No.: US 9,988,960 B2
(45) Date of Patent: Jun. 5, 2018

(54) EXHAUST GAS CONTROL APPARATUS OF INTERNAL COMBUSTION

(71) Applicant: TOYOTA JIDOSHA KABUSHIKI KAISHA, Toyota-shi, Aichi-ken (JP)

(72) Inventors: Yoshihisa Tsukamoto, Susono (JP); Kazuhiro Itoh, Mishima (JP); Hiromasa Nishioka, Susono (JP); Daichi Imai, Suntou-gun (JP); Hiroshi Ohtsuki, Gotenba (JP); Yasumasa Notake, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 17 days.

(21) Appl. No.: 15/311,252

(22) PCT Filed: May 20, 2015

(86) PCT No.: PCT/IB2015/000721
§ 371 (c)(1),
(2) Date: Nov. 15, 2016

(87) PCT Pub. No.: WO2015/181602
PCT Pub. Date: Dec. 3, 2015

(65) Prior Publication Data
US 2017/0138235 A1    May 18, 2017

(30) Foreign Application Priority Data

May 28, 2014  (JP) .................................. 2014-109906

(51) Int. Cl.
*F01N 3/023* (2006.01)
*F01N 3/027* (2006.01)
(Continued)

(52) U.S. Cl.
CPC ....... *F01N 3/0232* (2013.01); *B01D 46/0078* (2013.01); *B01D 46/446* (2013.01);
(Continued)

(58) Field of Classification Search
CPC ...... F01N 3/023; F01N 3/0232; F01N 3/0234; F01N 3/027; F01N 9/002; F01N 9/007;
(Continued)

(56) References Cited

U.S. PATENT DOCUMENTS

2009/0249770 A1* 10/2009 Ogiso .................. F01N 3/0253
60/287

FOREIGN PATENT DOCUMENTS

EP    1 536 120 A2    6/2005
JP    7-63039         3/1994
(Continued)

*Primary Examiner* — Audrey K Bradley
(74) *Attorney, Agent, or Firm* — Finnegan, Henderson, Farabow, Garrett & Dunner LLP

(57) ABSTRACT

An estimated trapped amount (PM) that is an estimated value of an amount of particulate matter that is trapped in a particulate filter arranged in an engine exhaust passage is calculated based on an engine operating state, and PM removal control is performed when the estimated trapped amount exceeds an upper limit amount. Reference temperature increase control is performed to remove the particulate matter from the particulate filter, and an actual temperature that is the temperature of the particulate filter while the reference temperature increase control is being performed is detected. A reference temperature that is the temperature of the particulate filter when it is assumed that the reference temperature increase control has been performed when the amount of particulate matter trapped in the particulate filter is a reference initial trapped amount is stored in advance. The estimated trapped amount is corrected based on the actual temperature and the reference temperature.

17 Claims, 18 Drawing Sheets

(51) Int. Cl.
  *F01N 9/00* (2006.01)
  *F01N 11/00* (2006.01)
  *B01D 46/00* (2006.01)
  *B01D 46/44* (2006.01)
  *B01D 46/46* (2006.01)

(52) U.S. Cl.
  CPC ............ *B01D 46/46* (2013.01); *F01N 3/023* (2013.01); *F01N 3/027* (2013.01); *F01N 3/0234* (2013.01); *F01N 9/002* (2013.01); *F01N 9/007* (2013.01); *F01N 11/002* (2013.01); *B01D 2279/30* (2013.01); *F01N 2550/04* (2013.01); *F01N 2900/0601* (2013.01); *F01N 2900/1404* (2013.01); *F01N 2900/1406* (2013.01)

(58) Field of Classification Search
  CPC ............... F01N 11/002; F01N 2550/04; F01N 2900/0601; F01N 2900/1404; F01N 2900/1406; B01D 46/0078; B01D 46/446; B01D 46/46; B01D 2279/30
  See application file for complete search history.

(56) References Cited

FOREIGN PATENT DOCUMENTS

| | | |
|---|---|---|
| JP | 7-310524 | 11/1995 |
| JP | 2005-155500 | 6/2005 |

\* cited by examiner

F I G . 19
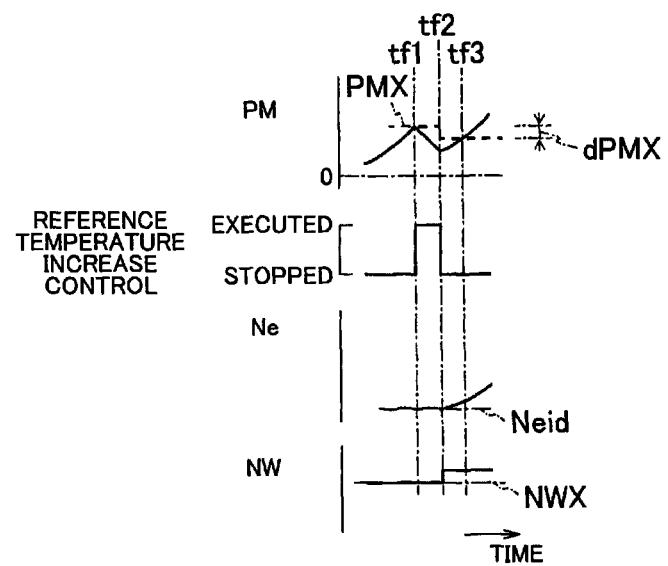

F I G . 21
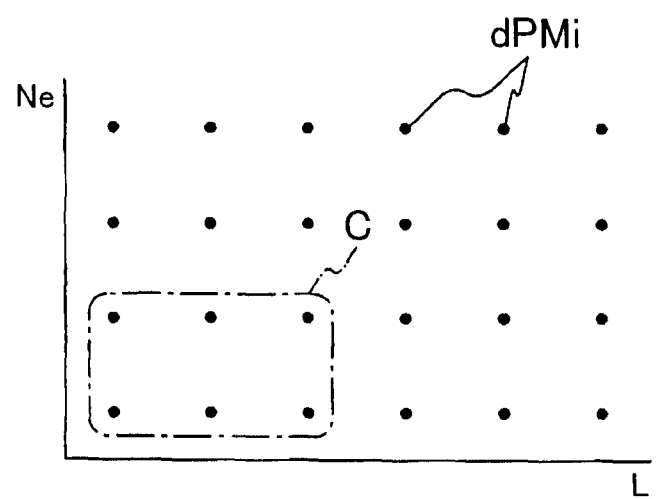

EXHAUST GAS CONTROL APPARATUS OF INTERNAL COMBUSTION

CROSS-REFERENCE TO RELATED APPLICATIONS

This application is a national phase application of International Application No. PCT/IB2015/000721, filed May 20, 2015, and claims the priority of Japanese Application No. 2014-109906, filed May 28, 2014, the content of both of which is incorporated herein by reference.

BACKGROUND OF THE INVENTION

1. Field of the Invention

The invention relates to an exhaust gas control apparatus of an internal combustion engine.

2. Description of Related Art

One known exhaust gas control apparatus of an internal combustion engine has a particulate filter for trapping particulate matter in exhaust gas, arranged in an engine exhaust passage. The exhaust gas control apparatus calculates an estimated trapped amount that is an estimated value of the amount of particulate matter trapped in the particulate filter, based on an operating state of the internal combustion engine, and when this estimated trapped amount exceeds a predetermined upper limit amount, the exhaust gas control apparatus performs temperature increase control that increases the temperature of the particulate filter to remove the particulate matter from the particulate filter.

However, the estimated trapped amount does not necessarily accurately represent the actual amount of trapped particulate matter. If the estimated trapped amount is less than the actual amount of trapped particulate matter, the temperature increase control will not be started even if the actual amount of trapped particulate matter exceeds the upper limit amount, so pressure loss of the particulate filter may become excessively large. On the other hand, if the estimated trapped amount is greater than the actual amount of trapped particulate material, the temperature increase control will be executed before the actual amount of trapped particulate material exceeds the upper limit amount, and as a result, the temperature increase control may be executed too frequently.

Therefore, an exhaust gas control apparatus of an internal combustion engine described in Japanese Patent Application Publication No. 2005-155500 (JP 2005-155500 A) is designed to detect a rate of increase in the temperature of the particulate filter while the engine is decelerating while temperature increase control is being performed, and correct the estimated trapped amount based on this temperature increase rate. More specifically, when the temperature increase rate is small, the estimated trapped amount is decrease-corrected, and when the temperature increase rate is large, the estimated trapped amount is increase-corrected.

However, the rate of increase in the temperature of the particulate filter when the temperature increase control is performed relies not only on the amount of trapped particulate matter when the temperature increase control starts, but also on the amount and temperature of exhaust gas that flows into the particulate filter while the temperature increase control is being performed, for example. More specifically, for example, when the amount of exhaust gas that flows into the particulate filter is large, the amount of heat removed from the particulate filter by the exhaust gas is large, so the temperature increase rate is smaller. In this case, even if the actual amount of trapped particulate matter is larger than the estimated trapped amount, the estimated trapped amount may be decrease-corrected. That is, in JP 2005-155500 A, the amount of heat removed from the particulate filter by the exhaust gas is not accurately ascertained, so the estimated trapped amount is not always able to be accurately corrected or calculated.

SUMMARY OF THE INVENTION

In view of the foregoing problem, the invention provides an exhaust gas control apparatus of an internal combustion engine, which is provided with a particulate filter and suitably calculates the estimated trapped amount of particulate matter.

Therefore, a first aspect of the invention relates to an exhaust gas control apparatus of an internal combustion engine, which includes a particulate filter and an electronic control unit. The particulate filter is configured to trap particulate matter in exhaust gas that is discharged from the internal combustion engine. This particulate filter is arranged inside an exhaust passage of the internal combustion engine. The electronic control unit is configured to i) calculate an estimated trapped amount based on an operating state of the internal combustion engine or a differential pressure before and after the particulate filter, the estimated trapped amount being an estimated value of an amount of the particulate matter, and the particulate matter being trapped in the particulate filter; ii) perform reference temperature increase control that increases a temperature of the particulate filter based on a predetermined reference state in order to remove the particulate matter trapped in the particulate filter; iii) detect an actual temperature that is the temperature of the particulate filter while the reference temperature increase control is being performed; iv) store, in advance, a reference temperature that is the temperature of the particulate filter when it is assumed that the reference temperature increase control has been performed when the amount of the particulate matter trapped in the particulate filter is a predetermined reference initial trapped amount; v) correct the estimated trapped amount based on the actual temperature and the reference temperature; and vi) perform particulate matter removal control that removes the particulate matter from the particulate filter, when the estimated trapped amount exceeds a predetermined upper limit amount.

Also, in the exhaust gas control apparatus described above, the electronic control unit may be configured to correct the estimated trapped amount based on a ratio of the actual temperature to the reference temperature, or a difference between the actual temperature and the reference temperature.

Also, in the exhaust gas control apparatus described above, the electronic control unit may be configured to i) store an estimated initial trapped amount, the estimated initial trapped amount being the estimated trapped amount when the reference temperature increase control is started; ii) calculate, based on the actual temperature and the reference temperature, an actual removed amount that is an amount of particulate matter actually removed from the particulate filter by the reference temperature increase control; and iii) correct the estimated trapped amount based on a ratio of the actual removed amount to the estimated initial trapped amount, or a difference between the actual removed amount and the estimated initial trapped amount.

Also, in the exhaust gas control apparatus described above, the electronic control unit may be configured to set the reference initial trapped mount to substantially zero.

Also, in the exhaust gas control apparatus described above, the electronic control unit may be configured to i) repeatedly calculate, based on the operating state of the internal combustion engine, increase amounts per unit time of the amount of particulate matter trapped in the particulate filter; ii) calculate the estimated trapped amount by integrating the increase amounts; and iii) correct the estimated trapped amount by correcting the increase amounts based on the actual temperature and the reference temperature.

Also, in the exhaust gas control apparatus described above, the electronic control unit may be configured to start the reference temperature increase control when the estimated trapped amount exceeds a set amount, the set amount being set smaller than the upper limit amount.

Also, in the exhaust gas control apparatus described above, the electronic control unit may be configured to complete the reference temperature increase control when the actual temperature substantially matches the reference temperature.

Also, in the exhaust gas control apparatus described above, the electronic control unit may be configured to correct the estimated trapped amount to the reference initial trapped amount, when the reference temperature increase control is completed.

Also, in the exhaust gas control apparatus described above, the electronic control unit may be configured to cancel the reference temperature increase control when the electronic control unit determines that the particulate filter is not in the reference state while the reference temperature increase control is being performed.

Also, in the exhaust gas control apparatus described above, the electronic control unit may be configured to correct the estimated trapped amount at the point when the reference temperature increase control is cancelled, based on the reference temperature and the actual temperature until the reference temperature increase control is cancelled, when the reference temperature increase control is cancelled.

Also, in the exhaust gas control apparatus described above, the electronic control unit my be configured to correct the estimated trapped amount based on a rate of increase of the temperature of the particulate filter when the rate of increase exceeds a predetermined set rate, after the reference temperature increase control is started.

Also, in the exhaust gas control apparatus described above, the electronic control unit may be configured to i) complete the reference temperature increase control when the reference temperature increase control is started and the actual temperature substantially matches the reference temperature, when the estimated trapped amount exceeds a set amount, the set amount being set smaller than the upper limit amount; and ii) reduce the set amount when the number of times that the reference temperature increase control is cancelled exceeds the predetermined upper limit number of times.

Also, in the exhaust gas control apparatus described above, the reference state may be a steady state. Here, also, the reference state may be a steady state in which an amount of gas is less than a predetermined set gas amount, the gas flowing into the particulate filter.

Further, the exhaust gas control apparatus described above may also include a temperature increaser. This temperature increaser may be configured to increase the temperature of the particulate filter without changing control of the internal combustion engine. The exhaust gas control apparatus may use the temperature increaser to perform the reference temperature increase control.

Moreover, the exhaust gas control apparatus described above may also include an electric heater. This electric heater may be provided in the temperature increaser, and the electric heater may be provided inside of the exhaust passage upstream of the particulate filter or inside of the particulate filter.

Also, another aspect of the invention relates to an exhaust gas control apparatus of an internal combustion engine, which includes a particulate filter and an electronic control unit. The particulate filter is configured to trap particulate matter in exhaust gas that is discharged from the internal combustion engine. This particulate filter is arranged inside an exhaust passage of the internal combustion engine. The electronic control unit is configured to i) perform reference temperature increase control that increases a temperature of the particulate filter based on a predetermined reference state in order to remove the particulate matter trapped in the particulate filter; ii) detect an actual temperature that is the temperature of the particulate filter while the reference temperature increase control is being performed; iii) store, in advance, a reference temperature that is the temperature of the particulate filter when it is assumed that the reference temperature increase control has been performed when an amount of the particulate matter trapped in the particulate filter is a predetermined reference initial trapped amount; iv) calculate an estimated trapped amount based on the actual temperature and the reference temperature, the estimated trapped amount being an estimated value of the amount of the particulate matter trapped in the particulate filter; and v) perform particulate matter removal control that removes the particulate matter from the particulate filter, when the estimated trapped amount exceeds a predetermined upper limit amount.

The estimated trapped amount is able to be more accurately corrected or calculated.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 19 is a time chart illustrating the fourth example embodiment of the invention;

FIG. 21 is a view of a map of increase amounts to illustrate another example in the first to fourth example embodiments of the invention.

DETAILED DESCRIPTION OF EMBODIMENTS

Figure 1:
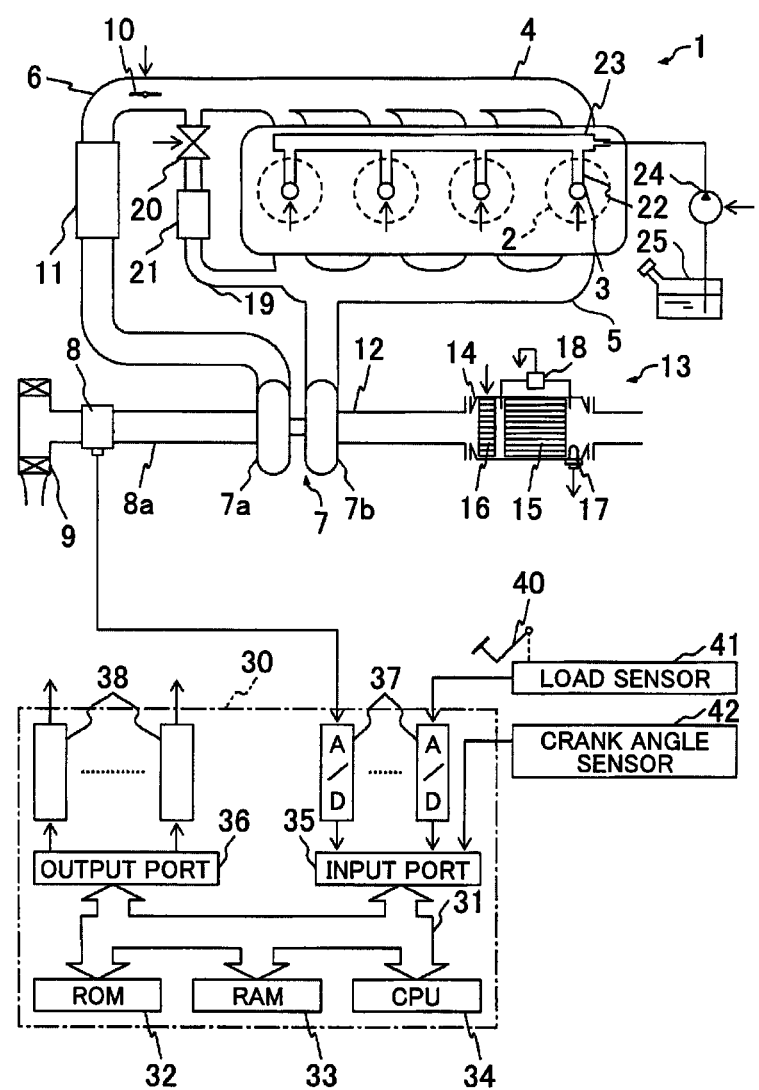
FIG. 1 is an overall view of an internal combustion engine according to first to fourth example embodiments of the invention.

FIG. 1 is a view of the main body of a compression-ignition internal combustion engine 1, combustion chambers 2 of cylinders, electronically-controlled fuel injection valves 3 for injecting fuel into the combustion chambers 2, an intake manifold 4, and an exhaust manifold 5. The intake manifold 4 is connected to an outlet of a compressor 7a of an exhaust turbocharger 7 via an intake duct 6, and an inlet of the compressor 7a is connected to an air cleaner 9 via an intake inlet pipe 8a within which an airflow meter 8 is arranged. An electrically-controlled throttle valve 10 is arranged inside the intake duct 6, and a cooling apparatus 11 for cooling the intake air flowing through the intake duct 6 is arranged around the intake duct 6.

Meanwhile, the exhaust manifold 5 is connected to an inlet of an exhaust turbine 7b of the exhaust turbocharger 7, and an outlet of the exhaust turbine 7b is connected to an exhaust after-treatment device 13 via an exhaust duct 12. The exhaust after-treatment device 13 includes a casing 14, and a particulate filter 15 is housed in this casing 14. Also, an electric heater 16 is housed in the casing 14 upstream of the particulate filter 15. A temperature sensor 17 that detects a temperature of exhaust gas that flows out from the particulate filter 15, and a differential pressure sensor 18 that detects a differential pressure before and after the particulate filter 15, are also mounted to the casing 14. The temperature of the exhaust gas that is detected by the temperature sensor 17 indicates the temperature of the particulate filter 15.

The exhaust manifold 5 and the intake manifold 4 are connected together via an exhaust gas recirculation (hereinafter, referred to simply as "EGR") passage 19. An electrically-controlled EGR control valve 20 is arranged in this EGR passage 19. Also, a cooling device 21 for cooling EGR gas that flows through the EGR passage 19 is arranged around the EGR passage 19. Meanwhile, the fuel injection valves 3 are connected to a common rail 23 via a fuel supply lines 22. This common rail 23 is connected to a fuel tank 25 via an electronically-controlled variable discharge fuel pump 24. Fuel stored in the fuel tank 25 is supplied into the common rail 23 by the fuel pump 24, and the fuel supplied into the common rail 23 is supplied to the fuel injection valves 3 via the fuel supply lines 22. In another example that is not shown, the internal combustion engine 1 is formed by a spark-ignition internal combustion engine.

An electronic control unit 30 is formed by a digital computer, and includes ROM (Read Only Memory) 32, RAM (Random Access Memory) 33, a CPU (a microprocessor) 34, an input port 35, and an output port 36, all of which are connected together by a bidirectional bus 31. Output signals from the airflow meter 8, the temperature sensor 17, and the differential pressure sensor 18 are input to the input port 35 via a corresponding AD converter 37. Also, a load sensor 41 that generates an output voltage proportional to a depression amount D of an accelerator pedal 40 is connected to the accelerator pedal 40, and the output voltage of the load sensor 41 is input to the input port 35 via the corresponding AD converter 37. Further, a crank angle sensor 42 that generates an output pulse every time a crankshaft rotates 15°, for example, is connected to the input port 35. In the CPU 34, an engine speed Ne is calculated based on the output pulse from the crank angle sensor 42. Meanwhile, the output port 36 is connected to the fuel injection valves 3, a driving actuator of the throttle valve 10, the electric heater 16, the EGR control valve 20, and the fuel pump 24, via a corresponding drive circuit 38.

Figure 2A:
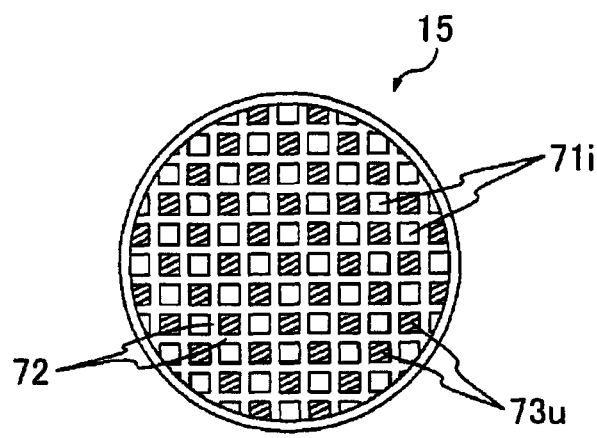
FIG. 2A is a front view of a particulate filter shown in FIG. 1.
Figure 2B:
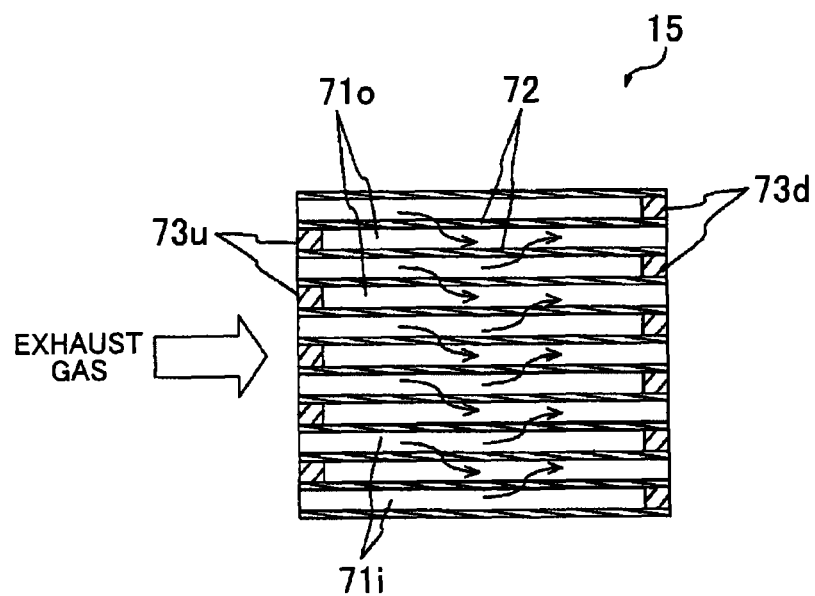
FIG. 2B is a side sectional view of the particulate filter shown in FIG. 1.

FIGS. 2A and 2B are views of the structure of the wall-flow type particulate filter 15. FIG. 2A is a front view of the particulate filter 15, and FIG. 2B is a side sectional view of the particulate filter 15. As shown in FIGS. 2A and 2B, the particulate filter 15 has a honeycomb structure, and includes a plurality of exhaust gas flow passages 71i and 71o that extend parallel to each other, and partition walls 72 that separate these exhaust gas flow passages 71i and 71o from each other. In the example shown in FIG. 2A, the exhaust gas flow passages 71i and 71o are formed by exhaust gas inflow passages 71i, each of which is open at an upstream end and closed by a plug 73d at a downstream end, and exhaust gas outflow passages 71o, each of which is closed by a plug 73u at an upstream end and open at a downstream end. The portions denoted by hatching in FIG. 2A represent the plugs 73u. Therefore, the exhaust gas inflow passages 71i and the exhaust gas outflow passages 71o are arranged alternately via the thin partition walls 72. In other words, the exhaust gas inflow passages 71i and the exhaust gas outflow passages 71o are arranged such that each exhaust gas inflow passage 71i is surrounded by four exhaust gas outflow passages 71o and each exhaust gas outflow passage 71o is surrounded by four exhaust gas inflow passages 71i. The partition walls 72 are porous, so exhaust gas first flows into the exhaust gas inflow passages 71i, and then flows out into the adjacent exhaust gas outflow passages 71o through the surrounding partition walls 72, as shown by the arrows in FIG. 2B. In another example that is not shown, the exhaust gas flow passages are formed by exhaust gas inflow passages, each of which is open at an upstream end and a downstream end, and exhaust gas outflow passages, each of which is closed by a plug at an upstream end and open at a downstream end. In this other example as well, exhaust gas that flows into the exhaust gas inflow passages passes through partition walls and flows out into the exhaust gas outflow passages.

The partition walls 72 are made of a ceramic such as cordierite, silicon carbide, silicon nitride, zirconia, titania, alumina, silica, mullite, lithium aluminum silicate, or zirconium phosphate, for example. These partition walls 72 carry a catalyst having an oxidative function. A platinum-group metal such as platinum Pt, rhodium Rh, or palladium Pd may be used as the catalyst having the oxidative function.

The electric heater 16 arranged upstream of the particulate filter 15 also has a honeycomb structure, so exhaust gas is able to pass through the electric heater 16. Therefore, when the electric heater 16 is activated, gas that passes through the electric heater 16 is heated by the electric heater 16. This heated gas then flows into the particulate filter 15, and as a result, the temperature of the particulate filter 15 rises. In another example that is not shown, the electric heater 16 is provided in the particulate filter 15.

The exhaust gas includes particulate matter formed mainly from solid-state carbon. This particulate matter is trapped in the particulate filter 15. Meanwhile, in the combustion chambers 2, combustion is performed with excess oxygen. Therefore, the particulate filter 15 is in an oxidizing atmosphere as long as fuel is not secondarily supplied from the fuel injection valves 3. As a result, the particulate matter trapped on the partition walls 72 is sequentially oxidized. If the amount of particulate matter that is trapped per unit time is greater than the amount of particulate matter that is oxidized per unit time, the amount of particulate matter that is trapped in the particulate filter 15 will increase over time while the engine is operating. If the amount of particulate matter trapped on the particulate filter 15 becomes large, pressure loss of the particulate filter 15 will end up becoming large.

Therefore, in the first example embodiment of the invention, an estimated trapped amount, which is an estimated value of the amount of particulate matter trapped in the particulate filter 15, is calculated, and when this estimated trapped amount exceeds a predetermined upper limit amount, particulate matter removal control (hereinafter referred to as PM removal control) that removes the particulate matter from the particulate filter is performed. As a result, the particulate matter is removed from the particulate filter 15, so pressure loss of the particulate filter 15 is able to be kept low.

Figure 3:
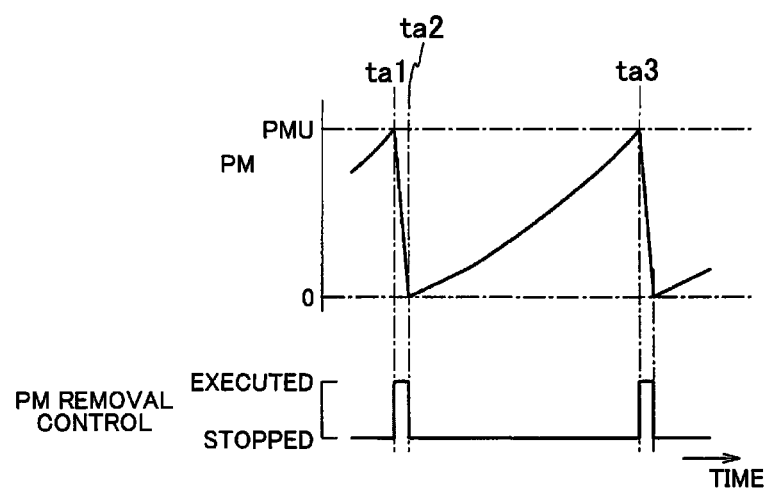
FIG. 3 is a time chart illustrating PM removal control in the first to fourth example embodiments.

That is, as shown in FIG. 3, when the estimated trapped amount PM exceeds the upper limit amount PMU at time ta1, the PM removal control is started. As a result, the particulate matter in the particulate filter 15 is oxidized and removed, so the estimated trapped amount PM decreases. Next, when the estimated trapped amount PM reaches a lower limit amount, e.g., zero, at time ta2, the PM removal control is completed. Then, when the estimated trapped amount PM exceeds the upper limit amount PMU again at time ta3, the PM removal control is started again. In this way, the PM removal control is repeatedly performed.

In the first example embodiment of the invention, the PM removal control is formed by temperature increase control that increases the temperature of the particulate filter 15 to a PM removal temperature and keeps it there, while keeping the particulate filter 15 in the oxidizing atmosphere in order to oxidize and remove the particulate matter. In one example of this temperature increase control, additional fuel that is different from the fuel for combustion is injected from the fuel injection valve 3 during the compression stroke or the exhaust stroke, and this added fuel is combusted in the combustion chamber 2, in the exhaust passage upstream of the particulate filter 15, or inside the particulate filter 15. In another example, not shown, of the temperature increase control, additional fuel is added from a fuel adding valve arranged in the exhaust passage upstream of the particulate filter 15, and this added fuel is combusted in the exhaust passage upstream of the particulate filter 15 or in of the particulate filter 15. In still another example, also not shown, of the temperature increase control, the electric heater 16 is activated. In these cases, the PM removal temperature is set to between 600° C. and 650° C., for example.

In yet another example that is not shown, the PM removal control is formed by NOx increase control that increases the amount of NOx in the exhaust gas that flows into the particulate filter 15, in order to oxidize and remove the particulate matter with NOx. In order to increase the amount of NOx, the amount of EGR gas is decreased, for example. In still another example that is not shown, the PM removal control is formed by ozone supply control that supplies ozone to the particulate filter 15 from an ozone supplier that is connected to the exhaust passage upstream of the particulate filter 15, in order to oxidize and remove the particulate matter with ozone.

Meanwhile, in the first example embodiment of the invention, the estimated trapped amount PM is calculated based on the engine operating state. That is, an increase amount dPMi per unit time and a decrease amount dPMd per unit time of the amount of trapped particulate matter are repeatedly calculated based on the engine operating state, and the estimated trapped amount PM is calculated by integrating the increase amount dPMi and the decrease amount dPMd. That is, the estimated trapped amount PM is calculated according to the following Expression (1).

$$PM=PM+dPMi-dPMd \tag{1}$$

Figure 4:
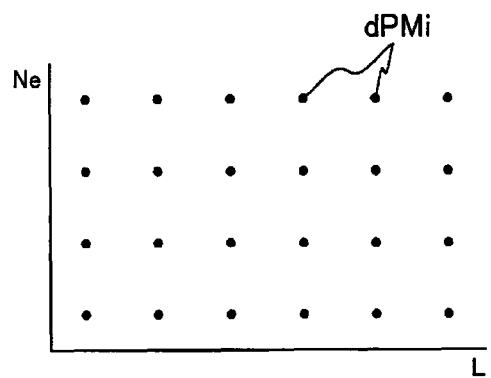
FIG. 4 is a view of a map of increase amounts per unit time of a trapped amount of particulate matter trapped in the particulate filter shown in FIG. 1.
Figure 5:
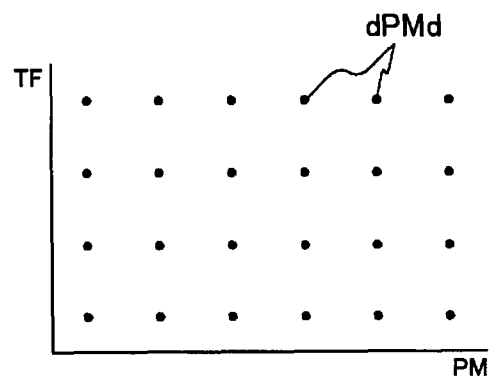
FIG. 5 is a view of a map of decrease amounts per unit time of a trapped amount of particulate matter trapped in the particulate filter shown in FIG. 1.

Here, the increase amounts dPMi are stored in advance in the ROM 32 in the form of a map shown in FIG. 4, as a function of the engine load L and the engine speed Ne, for example. Also, the decrease amounts dPMd are stored in advance in the ROM 32 in the form of a map shown in FIG. 5, as a function of the temperature TF of the particulate filter 15 and the estimated trapped amount PM, for example. In FIGS. 4 and 5, the increase amounts dPMi and the decrease amounts dPMd are shown in the form of dots. In another example that is not shown, the estimated trapped amount PM is calculated based on the differential pressure before and after the particulate filter 15. In this case, the estimated trapped amount PM becomes larger as this differential pressure increases.

There are cases in which the estimated trapped amount PM calculated by Expression (1) does not accurately represent the amount of particulate matter that is actually trapped in the particulate filter 15. Therefore, in the first example embodiment of the invention, the estimated trapped amount PM is corrected, and when this corrected estimated trapped amount is greater than the upper limit amount PMU, the PM removal control is performed. As a result, the PM removal control is able to be performed at the appropriate timing.

That is, reference temperature increase control that increases the temperature of the particulate filter 15 is performed based on a predetermined reference state, in order to remove particulate matter that is trapped in the particulate filter 15. Also, the estimated trapped amount PM when the reference temperature increase control is started is stored as an estimated initial trapped amount PM0. In other words, the actual temperature is the temperature of the particulate filter 15 when the reference temperature increase control is performed when the estimated trapped amount PM is the estimated initial trapped amount PM0. Then, the actual temperature that is the temperature of the particulate filter 15 when this reference temperature increase control is performed is detected.

In the first example embodiment of the invention, the reference state is a steady state. In particular, the reference state is a steady state in which the amount of gas that flows into the particulate filter 15 is less than a predetermined set gas amount. For example, it is determined that the particulate filter 15 is in the reference state when the engine is idling, and otherwise, it is determined that the particulate filter 15 is not in the reference state. When the engine is idling, the engine speed Ne is maintained at an idle speed, or the intake air amount is maintained at an idling air amount set according to the idle speed. Also, in the first example embodiment of the invention, the electric heater 16 is activated with a predetermined reference output, in order to preform reference temperature increase control. That is, in the reference temperature increase control of the first example embodiment of the invention, the temperature of the particulate filter 15 is increased using the electric heater 16 while the engine is idling, in order to remove the particulate matter that is trapped in the particulate filter 15. Here, the amount of gas that flows into the particulate filter 15 in the reference state is set small, so the amount of energy necessary to perform the reference temperature increase control is able to be reduced.

In the first example embodiment of the invention, the electric heater 16 is used to increase the temperature of the particulate filter 15. In this case, the temperature of the particulate filter 15 is able to be increased without changing engine control, i.e., separate from engine control. In another example that is not shown, technology that adds fuel into the exhaust gas from an adding valve arranged in the exhaust passage upstream of the particulate filter 15 is used to increase the temperature of the particulate filter 15 without changing engine control. In still another example that is not shown, a burner arranged in the exhaust passage upstream of the particulate filter 15 is activated to increase the temperature of the particulate filter 15 without changing engine control. In yet another example that is not shown, technology in which additional fuel that is different from the fuel for combustion is injected from the fuel injection valve 3 during the compression stroke or exhaust stroke, and this added fuel is combusted in the combustion chamber 2, in the exhaust passage upstream of the particulate filter 15, or in the particulate filter 15, for example, is used to increase the temperature of the particulate filter 15. However, with this technology it is necessary to change the engine control.

On the other hand, in the first example embodiment of the invention, a reference temperature that is the temperature of the particulate filter 15 when it is assumed that the reference temperature increase control described above has been performed when the amount of particulate matter that is trapped in the particulate filter 15 is a predetermined reference initial trapped amount, is obtained in advance, and this reference temperature is stored in the ROM 32 as a function of time passed from the start of the reference temperature increase control. Also, in the first example embodiment of the invention, the reference initial trapped amount is set to substantially zero. Therefore, the reference temperature is the temperature of the particulate filter 15 when it is assumed that the reference temperature increase control has been performed when almost no particulate matter is trapped in the particulate filter 15.

Figure 6:
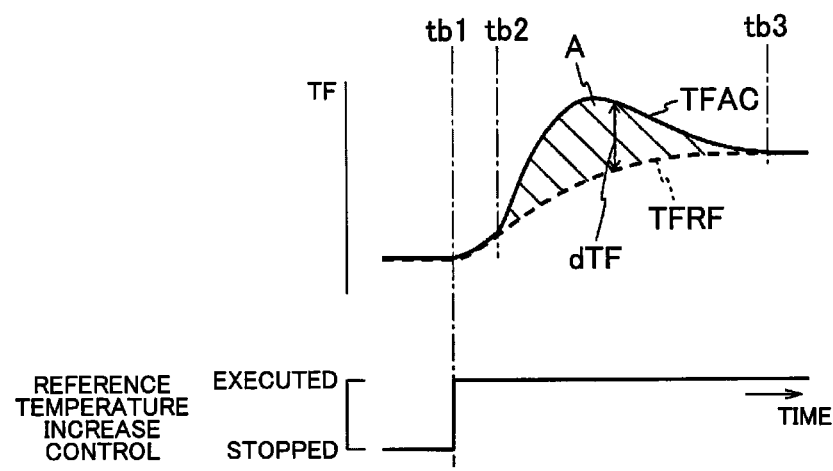
FIG. 6 is a time chart illustrating an actual temperature and a reference temperature of the particulate filter shown in FIG. 1.

FIG. 6 is a view of one example of an actual temperature TFAC and a reference temperature TFRF. In FIG. 6, the solid line indicates the actual temperature TFAC, and the broken line indicates the reference temperature TFRF. As shown in FIG. 6, when the reference temperature increase control starts at time tb1, the reference temperature TFRF increases, and then is maintained at a constant temperature that is set according to the output of the electric heater 16. On the other hand, the actual temperature TFAC first increases relatively slowly, while substantially matching the reference temperature TFRF. Next, at time tb2, the rate of increase in the actual temperature TFAC increases, and the actual temperature TFAC deviates from the reference temperature TFRF. In other words, a temperature difference dTF of the actual temperature TFAC with respect to the reference temperature TFRF increases from zero. This is because the particulate matter that is trapped in the particulate filter 15 starts to be oxidized and removed, so heat starts to be generated. Then, the amount of particulate matter trapped in the particulate filter 15 gradually decreases, so the amount of particulate matter that is removed per unit time gradually decreases. As a result, the amount of heat generated per unit time gradually decreases, so the temperature difference dTF gradually decreases. Then at time tb3, the actual temperature TFAC substantially matches the reference temperature TFRF, i.e., the temperature difference dTF becomes substantially zero. At this time, the amount of particulate matter trapped in the particulate filter 15 is substantially zero.

In the first example embodiment of the invention, the reference temperature increase control is completed when the actual temperature TFAC substantially matches the reference temperature TFRF, i.e., when the temperature difference dTF becomes substantially zero. Here, in the first example embodiment of the invention, the reference temperature TFRF is the temperature of the particulate filter 15 when it is assumed that the reference temperature increase control has been performed when the amount of trapped particulate matter is substantially zero, so it is also conceivable that the reference temperature increase control is completed when the amount of particulate matter that is actually trapped in the particulate filter 15 is substantially zero. Alternatively, the reference temperature increase control is completed when almost all of the particulate matter that was actually trapped in the particulate filter 15 has been removed. FIG. 6 is a view of an example in which the reference temperature increase control is continued even after the actual temperature TFAC has come to substantially match the reference temperature TFRF.

The temperature of the particulate filter 15 when the reference temperature increase control has been performed accurately represents the amount of heat generated by oxidizing and removing the particulate matter during the reference temperature increase control, and this amount of heat accurately represents the amount of particulate matter that has been oxidized and removed by the reference temperature increase control. In the first example embodiment of the invention, the reference temperature TFRF is the temperature of the particulate filter 15 when almost no particulate matter is trapped in the particulate filter 15, as described above, so almost no heat is generated by the oxidation and removal of particulate matter at this time. Therefore, the temperature difference dTF of the actual temperature TFAC with respect to the reference temperature TFRF accurately represents the amount of particulate matter that has actually been oxidized and removed from the particulate filter 15 per unit time by the reference temperature increase control. Thus, the integrated value of the temperature difference dTF accurately represents an actual removed amount that is the amount of particulate matter that has actually been removed from the particulate filter 15 by the reference temperature increase control. The integrated value of the temperature difference dTF corresponds to the size of a region A that is surrounded by a curved line indicative of the actual temperature TFAC and a curved line indicative of the reference temperature TFRF. In FIG. 6, this region A is indicated by hatching.

Figure 7:
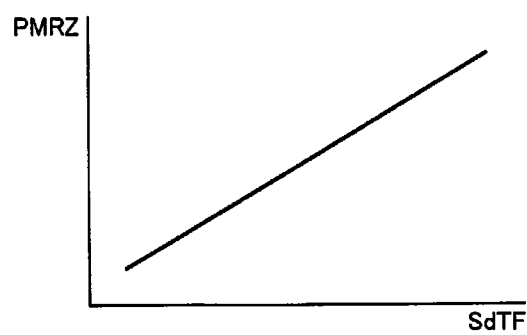
FIG. 7 is a view of a map of an actual removed amount of the particulate matter.

In the first example embodiment of the invention, while the reference temperature increase control is being performed, the temperature difference dTF (dTF=TFAC−TFRF) is repeatedly calculated (dTF=TFAC−TFRF), and an integrated value SdTF of the temperature difference dTF is repeatedly calculated (SdTF=SdTF+dTF). Next, an actual removed amount PMRZ is calculated from the temperature difference integrated value SdTF. The actual removed amount PMRZ is stored in advance in the ROM 32 in the form of a map shown in FIG. 7, as a function of the temperature difference integrated value SdTF. In another example that is not shown, the actual removed amount PMRZ is calculated from an integrated value of a ratio (TFAC/TFRF) of the actual temperature TFAC to the reference temperature TFRF.

When the amount of particulate matter that is actually trapped in the particulate filter 15 when the reference temperature increase control is started is referred to as the "actual initial trapped amount", the actual removed amount PMRZ when the reference temperature increase control is completed accurately represents the actual initial trapped amount. Therefore, in the first example embodiment of the invention, an estimated initial trapped amount PM0 is compared to the actual removed amount PMRZ, and the estimated trapped amount PM is corrected based on the results of this comparison. That is, when it is not determined that the estimated initial trapped amount PM0 is substantially equal to the actual removed amount PMRZ, the estimated trapped amount PM is corrected using the actual removed amount PMRZ. More specifically, a correction coefficient KPMi is updated from the actual removed amount PMRZ. This correction coefficient KPMi is calculated in the form of a ratio (PMRZ/PM0) of the actual removed amount PMRZ to the estimated initial trapped amount PM0, for example. In another example that is not shown, the correction coefficient KPMi is calculated based on a difference (PMRZ−PM0) between the actual removed amount PMRZ and the estimated initial trapped amount PM0. Next, the increase amounts dPMi indicated in the form of dots in FIG. 4 are corrected using the correction coefficient KPMi (dPMi=dPMi×KPMi). That is, when the estimated initial trapped amount PM0 is smaller than the actual removed amount PMRZ, for example, the estimated trapped amount PM is smaller than the actual amount of trapped particulate matter. In this case, the correction coefficient KPMi described above is greater than 1, so the increase amounts dPMi are increase-corrected. The estimated trapped amount PM is calculated using the increase amounts dPMi that have been corrected in this way. In another example that is not shown, the increase amounts dPMi shown in FIG. 4 are integrated without being corrected, and the integrated value obtained at this time is corrected by the correction coefficient KPMi. In either case, the estimated trapped amount PM that has been corrected in this way accurately represents the actual amount of trapped particulate matter. The initial value of the correction coefficient KPMi is 1.

On the other hand, if it is determined that the estimated initial trapped amount PM0 is substantially equal to the actual removed amount PMRZ, the increase amounts dPMi are not corrected.

In the first example embodiment of the invention, the amount of particulate matter that is actually trapped in the particulate filter 15 when the reference temperature increase control is completed is substantially zero, as described above. Therefore, the estimated trapped amount PM is set to zero when the reference temperature increase control is completed. In this regard, there are also cases in which the estimated trapped amount PM calculated according to Expression (1) is not zero when the reference temperature increase control is completed. In this sense, in the first example embodiment of the invention, it is also possible to view the estimated trapped amount PM as being corrected to zero when the reference temperature increase control is completed.

Figure 8:
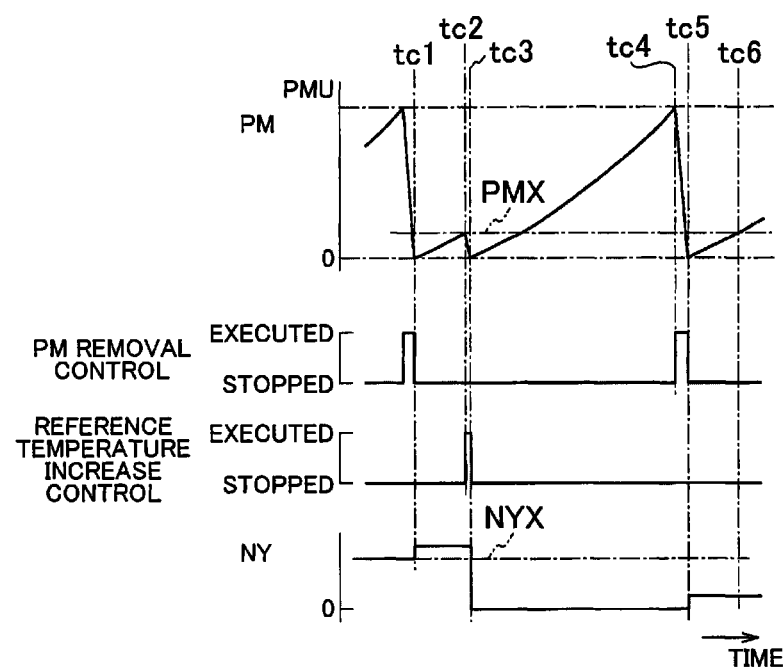
FIG. 8 is a time chart illustrating reference temperature increase control of the first to fourth example embodiments.

Furthermore, in the first example embodiment of the invention, the reference temperature increase control is performed when the estimated trapped amount PM exceeds a set amount PMX that is set smaller than the upper limit amount PMU described above. Also, in the first example embodiment of the invention, the reference temperature increase control is performed when the number of times the PM removal control is performed after the most recent reference temperature increase control is completed, or the number of times NY that PM removal control was performed after the engine was first operated, exceeds a predetermined set number of times NYX. That is, as shown in FIG. 8, when the PM removal control is completed at time tc1, the number of times NY that the PM removal control is executed (i.e., the number of executions NY of PM removal control) is incremented by 1. As a result, the number of executions NY will exceed the set number of times NYX. Also, the estimated trapped amount PM increases. Next, when the estimated trapped amount PM exceeds the set amount PMX at time tc2, the number of executions NY at this time is larger than the set number of times NYX, so the reference temperature increase control is started. As a result, the estimated trapped amount PM decreases. Next, when the reference temperature increase control is completed at time tc3, the number of executions NY returns to zero. Also, the estimated trapped amount PM increases again. Then, the PM removal control is started again at time tc4. Then when the PM removal control is completed at time tc5, the number of executions NY is incremented by 1. Also, the estimated trapped amount PM increases again. Next, at time tc6, the estimated trapped amount PM exceeds the set amount PMX. At this time, the number of executions NY does not exceed the set number of times NYX, so the reference temperature increase control is not performed. In this way, the reference temperature increase control is able to be kept from being performed frequently. Also, the set amount PMX is set small, so the period of time required to complete the reference temperature increase control is able to be shortened, and as a result, the amount of energy required for the reference temperature increase control is able to be reduced.

When the reference temperature increase control is being performed and the engine is accelerating and not idling, for example, it is determined that the particulate filter 15 is not in the reference state. In the first example embodiment of the invention, when the reference temperature increase control is being performed and it is determined that the particulate filter 15 is not in the reference state, the reference temperature increase control is cancelled. That is, the electric heater 16 is deactivated, and detection of the actual temperature TFAC is cancelled.

Figure 9:
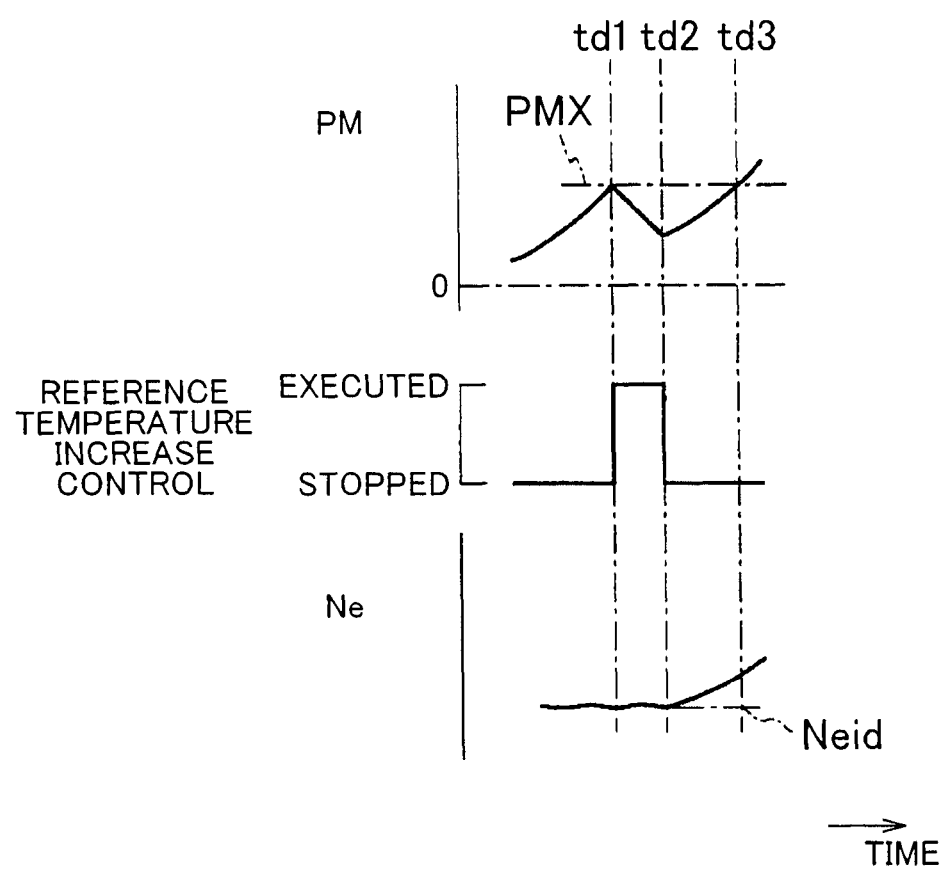
FIG. 9 is a time chart illustrating cancellation of the reference temperature increase control in the first to fourth example embodiments.

That is, as shown in FIG. 9, at time td1, the estimated trapped amount PM exceeds the set amount PMX. At this time, the engine speed Ne is an idle speed Neid, so the engine is idling. Therefore, it is determined that the particulate filter 15 is in the reference state, so the reference temperature increase control is started. Then, at time td2, when the engine speed Ne becomes higher than the idle speed Neid and the engine is therefore no longer idling, it is determined that the particulate filter 15 is not in the reference state, so the reference temperature increase control is cancelled. Next, at time td3, the estimated trapped amount PM exceeds the set amount PMX again. At this time, it is determined that the particulate filter 15 is not in the reference state, so the reference temperature increase control is not started.

When the reference temperature increase control is cancelled, almost none of the particulate matter trapped in the particulate filter 15 is removed, so the actual removed amount PMRZ at the point when the reference temperature increase control was cancelled does not accurately represent the actual initial trapped amount. Therefore, in the first example embodiment of the invention, the estimated trapped amount PM is not corrected when the reference temperature increase control has been cancelled. Also, when the reference temperature increase control has been cancelled, the estimated trapped amount PM is kept at the estimated trapped amount PM at that time.

Therefore, when expressed conceptually, the estimated trapped amount PM is corrected based on the actual temperature TFAC and the reference temperature TFRF. Also, the estimated trapped amount PM is also corrected based on the ratio of the actual temperature TFAC to the reference temperature TFRF or the difference between them. Moreover, the estimated trapped amount PM is also corrected based on the ratio of the actual removed amount PMRZ to the estimated initial trapped amount PM0 or the difference between them.

In this case, the actual removed amount PMRZ is calculated based on the reference temperature TFRF and the actual temperature TFAC that is detected under the same conditions, i.e., the reference state, so the actual removed amount PMRZ is able to be accurately calculated, and the estimated trapped amount PM is corrected based on this accurate actual removed amount PMRZ. Thus, the estimated trapped amount PM is able to be accurately corrected.

In another example that is not shown, a reference initial trapped amount is set to a value greater than zero. In this case, the temperature difference integrated value SdTF described above accurately represents the difference between the actual initial trapped amount and the reference initial trapped amount. Therefore, by adding the reference initial trapped amount to the particulate matter trapped amount represented by the temperature difference integrated value SdTF, the actual initial trapped amount or the actual removed amount PMRZ is able to be accurately calculated.

Figure 10:
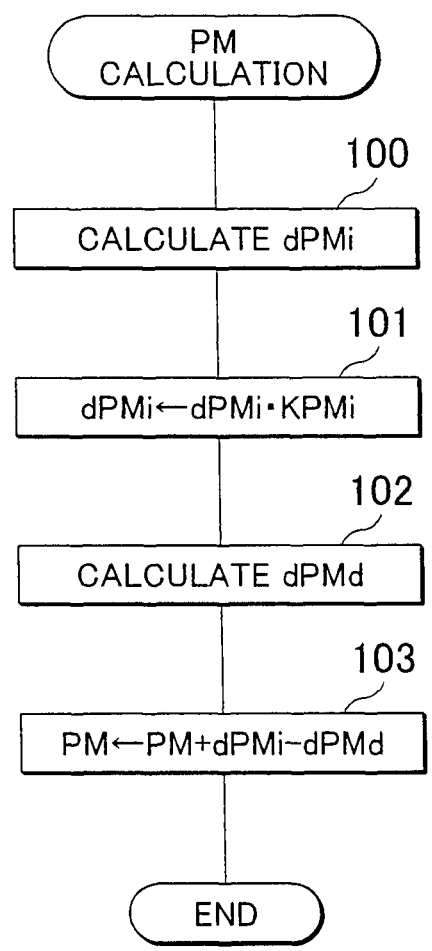
FIG. 10 is a flowchart of a portion of a routine executed to calculate an estimated trapped amount in the first to fourth example embodiments of the invention.
Figure 11:
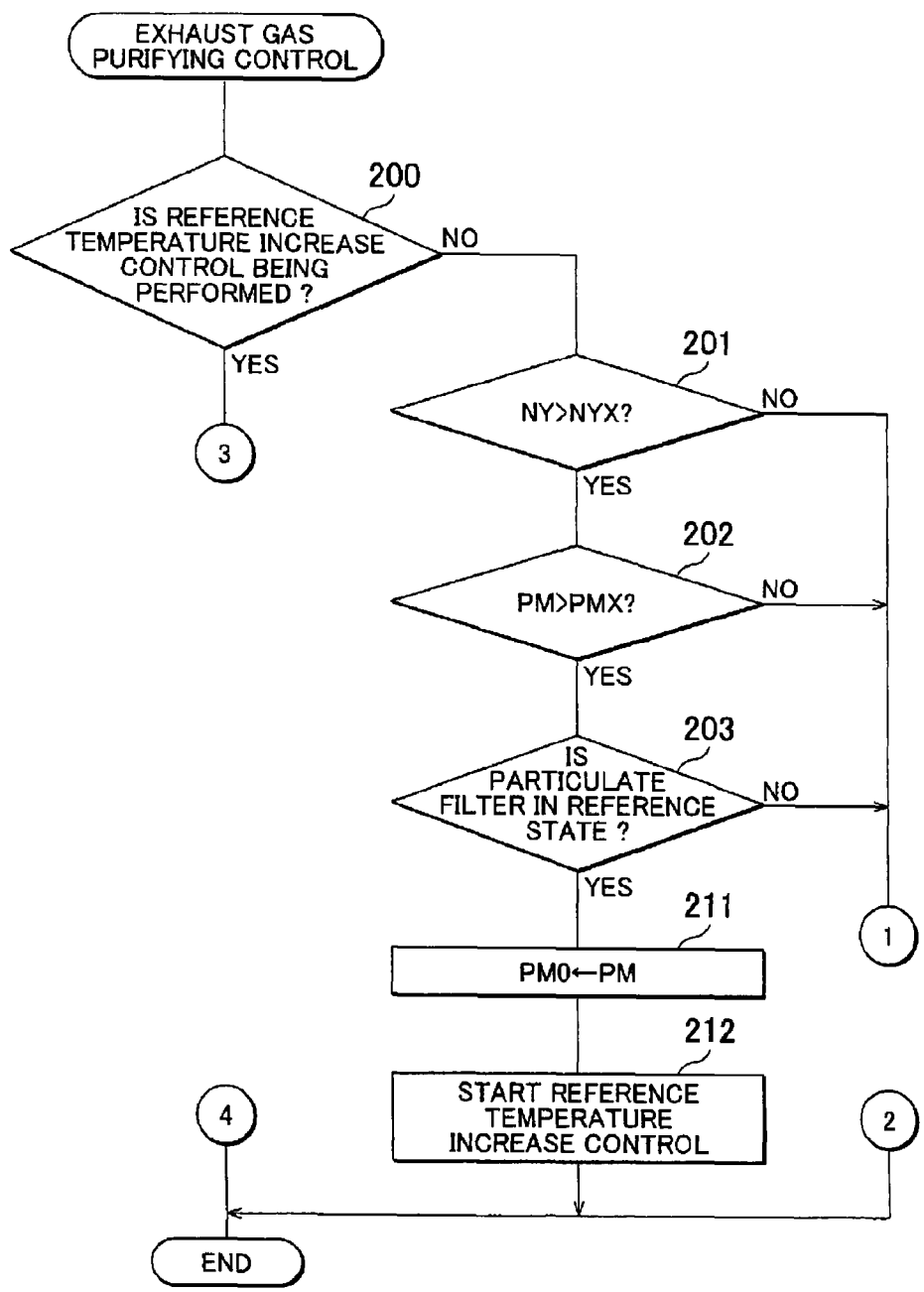
FIG. 11 is a flowchart illustrating a portion of a routine for executing exhaust gas purifying control in the first to fourth example embodiments of the invention.
Figure 12:
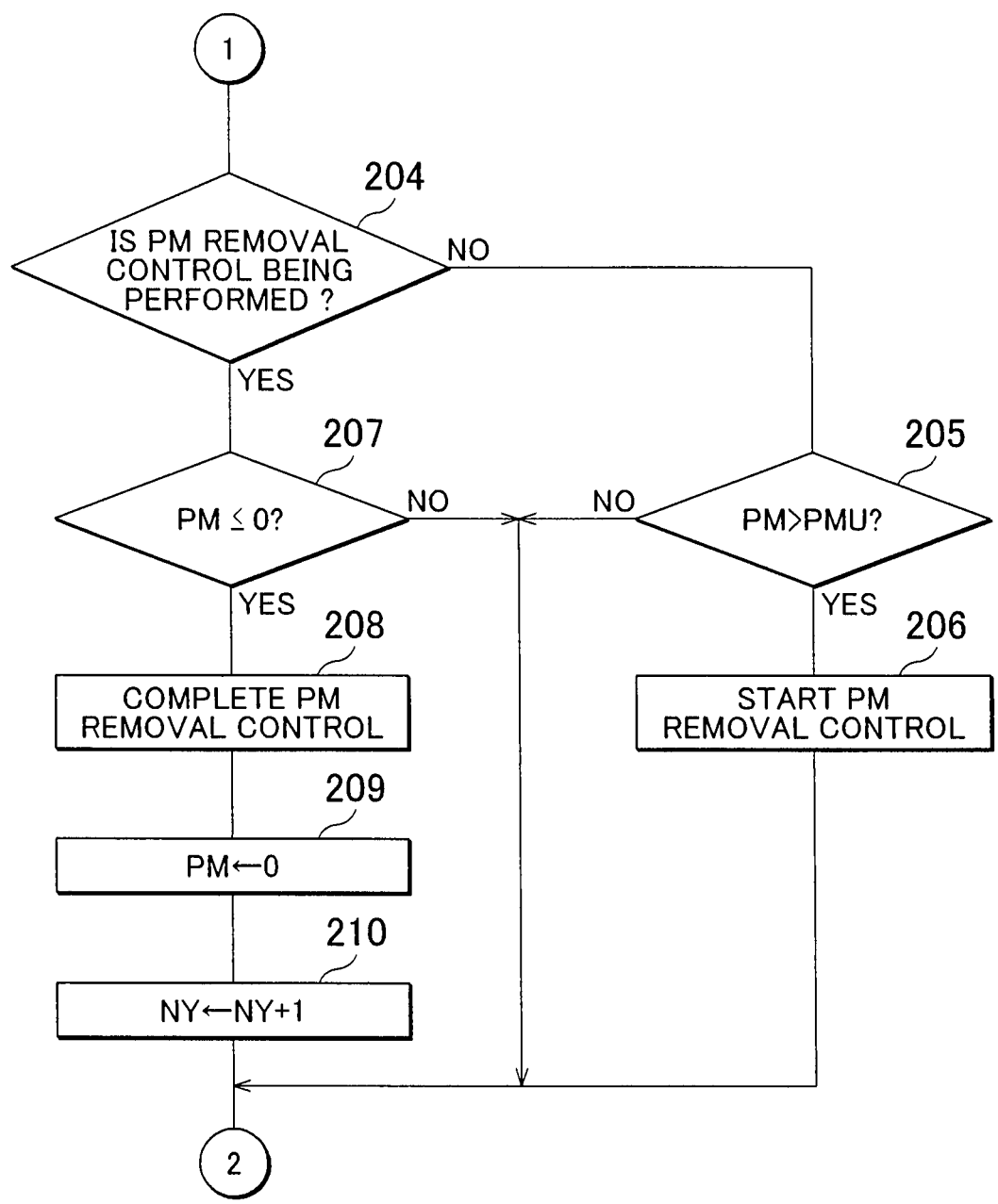
FIG. 12 is a flowchart of a portion of the routine for executing exhaust gas purifying control in the first to fourth example embodiments of the invention.
Figure 13:
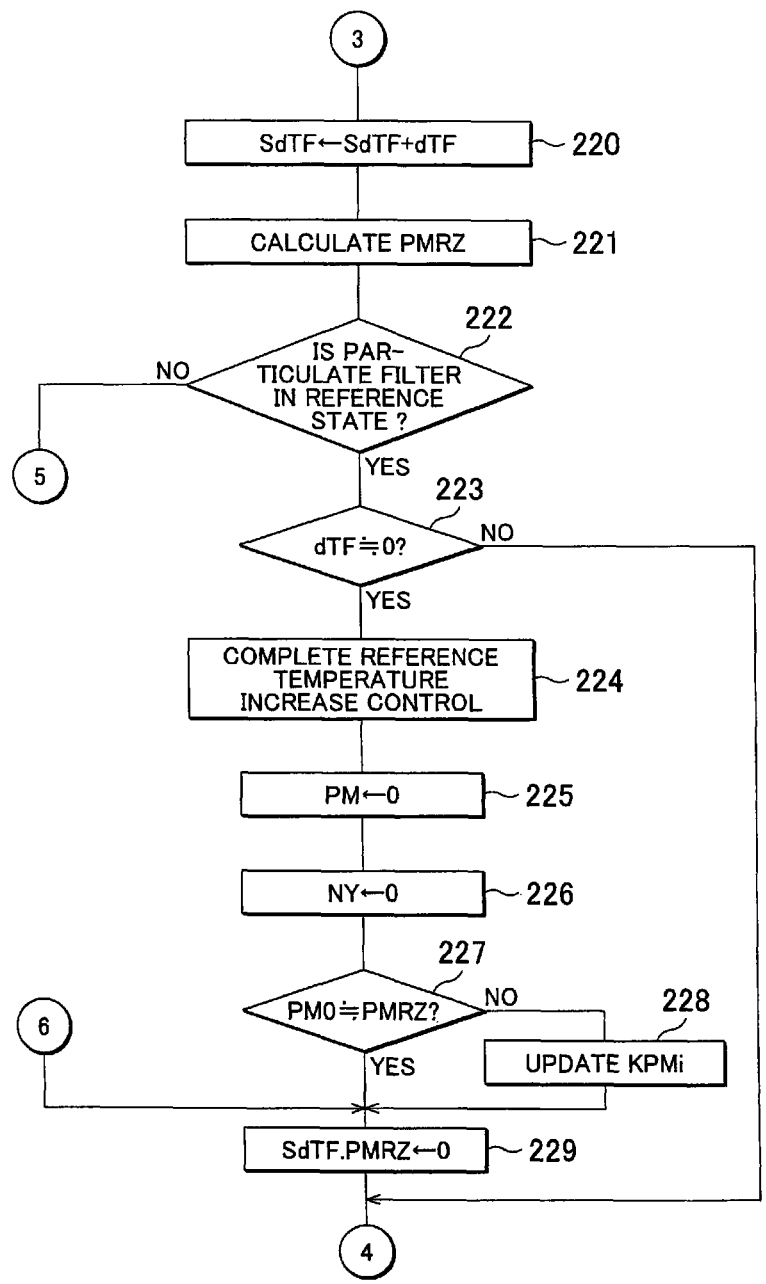
FIG. 13 is a flowchart of another portion of the routine for executing exhaust gas purifying control in the first to four the example embodiments of the invention.
Figure 14:
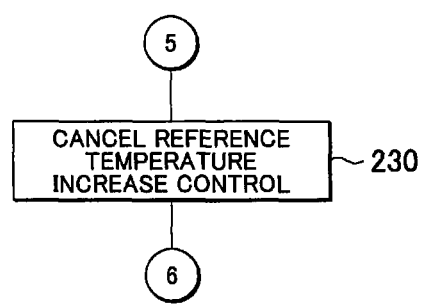
FIG. 14 is a flowchart of yet another portion of the routine for executing exhaust gas purifying control according to the first example embodiment of the invention.
Figure 15:
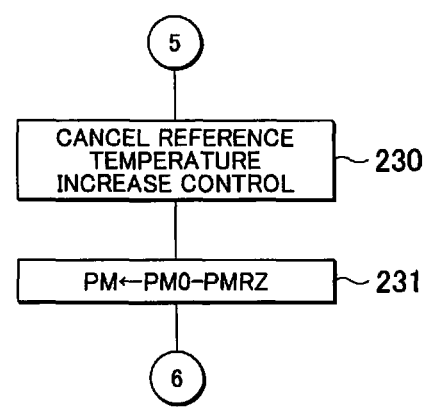
FIG. 15 is a flowchart that corresponds to FIG. 14 of the first example embodiment and illustrates a routine for executing exhaust gas purifying control according to the second example embodiment of the invention.

FIG. 10 is a view of a routine for calculating the estimated trapped amount PM described above. This routine is executed by interrupting every predetermined set period of time. Referring to FIG. 10, in step 100, the increase amount dPMi per unit time of the trapped amount of particulate matter is calculated using the map in FIG. 4. Next in step 101, the increase amount dPMi is corrected by the correction coefficient KPMi (dPMi←dPMi×KPMi). Then in step 102, the decrease amount dPMd per unit time of the amount of trapped particulate matter is calculated using the map in FIG. 5. Next in step 103, the estimated trapped amount PM is calculated according to Expression (1).

FIGS. 11 to 14 are views illustrating a routine for executing the exhaust gas purifying control described above. This routine is executed by interrupting every predetermined set period of time. Referring to FIGS. 11 to 14, in step 200, it is determined whether the reference temperature increase control is currently being performed. If the reference temperature increase control is not currently being performed, the process proceeds on to step 201, where it is determined whether the number of executions NY of the PM removal control after the most recent reference temperature increase control has been completed is greater than the set number of times NYX. If NY>NYX, the process proceeds on to step 202, where it is determined whether the estimated trapped amount PM is greater than the set amount PMX. If PM>PMX, the process proceeds on to step 203, where it is determined whether the particulate filter 15 is in the reference state. If it is determined that the particulate filter 15 is in the reference state, the process proceeds on to step 211. On the other hand, if it is determined that NY≤NYX in step 201, that PM≤PMX in step 202, or that the particulate filter 15 is not in the reference state in step 203, the process proceeds on to step 204.

In step 204, it is determined whether the PM removal control is currently being performed. If the PM removal control is not currently being performed, the process then proceeds on to step 205, where it is determined whether the estimated trapped amount PM calculated in the routine in FIG. 10 is greater than the upper limit amount PMU. If PM≤PMU, this cycle of the routine ends. If PM>PMU, then the process proceeds on to step 206, where the PM removal control is started.

If the PM removal control is being performed, the process proceeds from step 204 to step 207, where it is determined whether the estimated trapped amount PM is equal to or less than zero. If PM>0, this cycle of the routine ends. That is, the PM removal control is continued. On the other hand, if PM≤0, the process proceeds from step 207 to step 208, where the PM removal control is completed. Then in step 209, the estimated trapped amount PM is set to zero. Next in step 210, the number of executions NY of the PM removal control is incremented by 1.

On the other hand, if it is determined that NY>NYX, that PM>PMX, and that the particulate filter 15 is in the reference state, the process proceeds from step 203 to step 211. In step 211, the estimated trapped amount PM at this time is stored as the estimated initial trapped amount PM0. Next in step 212, the reference temperature increase control is started.

If the reference temperature increase control is being performed, the process proceeds from step 200 to step 220, where the temperature difference integrated value SdTF is calculated (SdTF=SdTF+dTF). Then in step 221, the actual removed amount PMRZ is calculated using the map in FIG. 7. Next in step 222, it is determined whether the particulate filter 15 is in the reference state. If it is determined that the particulate filter 15 is in the reference state, i.e., if the particulate filter 15 is being kept in the reference state, then the process proceeds on to step 223, where it is determined whether the temperature difference dTF is substantially zero. If it is determined that the temperature difference dTF is not substantially equal to zero, this cycle of the routine ends. That is, the reference temperature increase control is continued. On the other hand, if it is determined that the temperature difference dTF is substantially equal to zero (i.e., dTF≈0), the process proceeds from step 223 to step 224, where the reference temperature increase control is completed. Then in step 225, the estimated trapped amount PM is set to zero. Next in step 226, the number of executions NY of the PM removal control is reset to zero. Then in step 227, it is determined whether the actual removed amount PMRZ is substantially equal to the estimated initial trapped amount PM0. If it is determined that the actual removed amount PMRZ is not substantially equal to the estimated initial trapped amount PM0, the process then proceeds on to step 228, where the correction coefficient KPMi is updated. Then the process proceeds on to step 229. On the other hand, if it is determined that the actual removed amount PMRZ is substantially equal to the estimated initial trapped amount PM0 (i.e., PMRZ≈PM0), the process jumps from step 227 to step 229. In this case, the correction coefficient KPMi is not updated.

On the other hand, if it is determined that the particulate filter 15 is not in the reference state while the reference temperature increase control is being performed, the process proceeds from step 222 to step 230, where the reference temperature increase control is cancelled. Then the process proceeds on to step 229. In this case as well, the correction coefficient KPMi is not updated. In step 229, the temperature difference integrated value SdTF and the actual removed amount PMRZ are reset to zero.

Next, a second example embodiment of the invention will be described. Hereinafter, the differences from the first example embodiment of the invention described above will be described. In the second example embodiment of the invention as well, the actual removed amount PMRZ is repeatedly calculated while the reference temperature increase control is being performed, similar to the first example embodiment. Therefore, the actual removed amount PMRZ at the point when the reference temperature increase control is cancelled accurately represents the amount of particulate matter that has actually been removed from the particulate filter 15 between the time that the reference temperature increase control starts and the time that the reference temperature increase control is cancelled. Thus, the amount of trapped particulate matter at the point when the reference temperature increase control is cancelled is represented by the difference of the estimated initial trapped amount PM0 minus the actual removed amount PMRZ at the point when the reference temperature increase control was cancelled (i.e., PM0-PMRZ).

Therefore, in the second example embodiment of the invention, when the reference temperature increase control is cancelled, the estimated trapped amount PM at the point when the reference temperature increase control is cancelled is corrected to the difference of the estimated initial trapped amount PM0 minus the actual removed amount PMRZ (PM0-PMRZ). As a result, the estimated trapped amount PM is able to be more accurately corrected.

In the second example embodiment of the invention, the routine shown in FIGS. 11 to 13 and FIG. 15 is executed. That is, if it is determined that the particulate filter 15 is not in the reference state while the reference temperature increase control is being performed, the process proceeds from step 222 in FIG. 13 on to step 230 in FIG. 15, where the reference temperature increase control is cancelled. Then in step 231, the estimated trapped amount PM is corrected to the difference of the estimated initial trapped amount PM0 minus the actual removed amount PMRZ at the point when the reference temperature increase control was cancelled (i.e., PM0-PMRZ). Then the process proceeds on to step 229 in FIG. 13.

Figure 16:
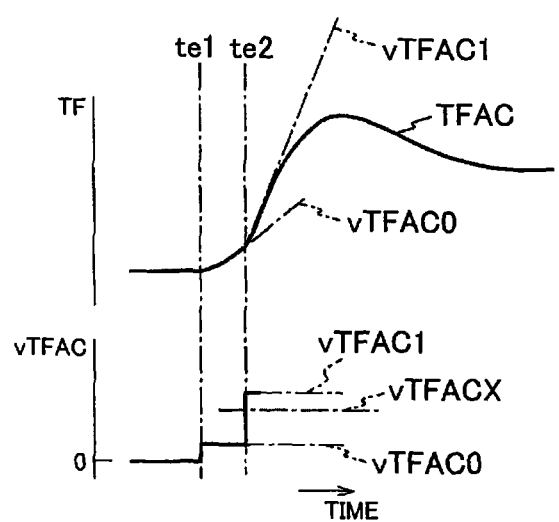
FIG. 16 is a time chart showing a rate of increase in actual temperature to illustrate the third example embodiment.

Next, a third example embodiment of the invention will be described. Hereinafter, the differences from the first example embodiment of the invention will be described. As described above, when the reference temperature increase control starts, the actual temperature TFAC rises slowly at first, and then rises sharply. That is, as shown in FIG. 16, when the reference temperature increase control starts at time te1, the actual temperature TFAC first rises at a relatively slow rate of increase or slope vTFAC0, and then at time te2, the actual temperature TFAC rises at a relatively fast rate of increase vTFAC1. In other words, the rate of increase vTFAC of the actual temperature TFAC at time te2 exceeds a predetermined set rate of increase vTFACX, and reaches a relatively high rate of increase vTFAC1. This is because the particulate matter that is trapped in the particulate filter 15 starts to oxidize, as described above.

Figure 17:
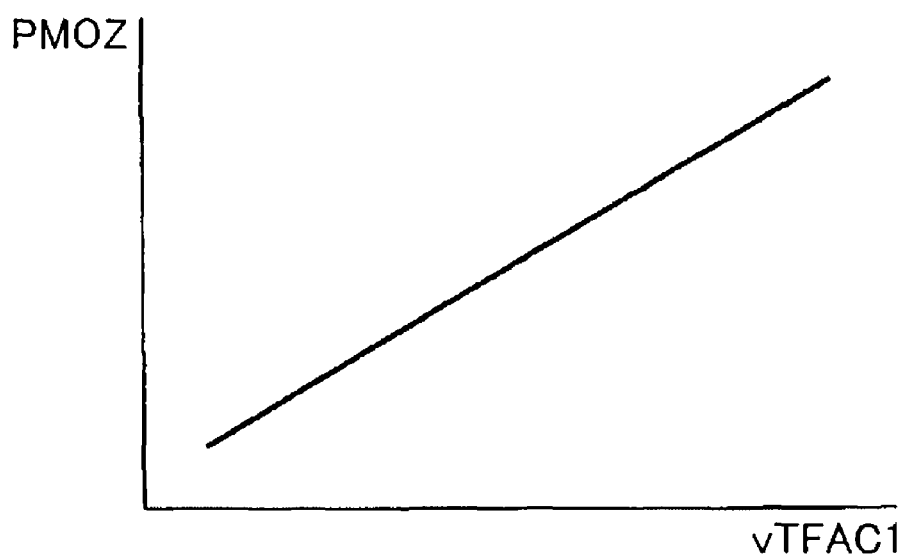
FIG. 17 is a view of a map of an actual initial trapped amount to illustrate the third example embodiment.

The rate of increase vTFAC1 when the set rate of increase vTFACX was exceeded accurately represents the actual initial trapped amount. That is, as shown in FIG. 17, the actual initial trapped amount becomes larger as the rate of increase vTFAC1 increases. On the other hand, the difference of the actual initial trapped amount minus the actual removed amount PMRZ at the point when the reference temperature increase control was cancelled accurately represents the amount of trapped particulate matter PMZ at the point when the reference temperature increase control was cancelled.

Therefore, in the third example embodiment of the invention, when the reference temperature increase control is cancelled, the rate of increase vTFAC1 when the set rate vTFACX was exceeded is calculated, and an actual initial trapped amount PM0Z is calculated using a map shown in FIG. 17 from this rate of increase vTFAC1. Then the amount of trapped particulate matter PMZ at the point when the reference temperature increase control was cancelled is calculated from the actual initial trapped amount PM0Z and the actual removed amount PMRZ at the point when the reference temperature increase control was cancelled (i.e., PMZ=PM0Z−PMRZ). Next, the estimated trapped amount PM calculated according to Expression (1) at the point when the reference temperature increase control was cancelled is compared to the amount of trapped particulate matter PMZ at the point when the reference temperature increase control was cancelled, and the estimated trapped amount PM is corrected based on the results of this comparison. That is, when the estimated trapped amount PM is substantially the same as the amount of trapped particulate matter PMZ, the estimated trapped amount PM is corrected to the amount of trapped particulate matter PMZ at the point when the reference temperature increase control was cancelled. Also, the correction coefficient KPMi is updated from the amount of trapped particulate matter PMZ, and the increase amounts dPMi are corrected using this correction coefficient KPMi (dPMi=dPMi×KPMi). The correction coefficient KPMi in this case is calculated in the form of a ratio (PMZ/PM) of the amount of trapped particulate matter PMZ to the estimated trapped amount PM, for example. As a result, the estimated trapped amount PM is able to be accurately corrected even when the reference temperature increase control is cancelled.

In this way, in the third example embodiment of the invention, the estimated trapped amount PM is corrected based on the actual removed amount PMRZ when the reference temperature increase control is completed, and the estimated trapped amount PM is corrected based on the rate of increase vTFAC1 of the actual temperature TFAC when the set rate vTFACX was exceeded, when the reference temperature increase control has been cancelled, i.e., when the actual removed amount PMRZ is unable to be calculated.

In the third example embodiment of the invention, the routine shown in FIGS. 11 to 13 and FIG. 18 is executed. That is, if it is determined that the particulate filter 15 is not in the reference state while the reference temperature increase control is being performed, the process proceeds from step 222 in FIG. 13 on to step 230 in FIG. 18, where the reference temperature increase control is cancelled. Then in step 231$a$, the rate of increase vTFAC1 of the actual temperature TFAC when the set rate vTFACX was exceeded is calculated. Next in step 232$a$, the actual initial trapped amount PM0Z is calculated using the map in FIG. 17. Then in step 233$a$, the amount of trapped particulate matter PMZ at the point when the reference temperature increase control was cancelled is calculated (PMZ=PM0Z−PMRZ). Then in step 234$a$, it is determined whether the estimated trapped amount PM at this point is substantially equal to the amount of trapped particulate matter PMZ at the point when the reference temperature increase control was cancelled. If it is determined here that the estimated trapped amount PM is not substantially equal to the amount of trapped particulate matter PMZ, the process then proceeds on to step S235$a$, where the estimated trapped amount PM is corrected to the amount of trapped particulate matter PMZ at the point when the reference temperature increase control was cancelled. Then in step 236$a$, the correction coefficient KPMi is updated. Next, the process proceeds on to step 229 in FIG. 13. On the other hand, if it is determined in step 234$a$ that the estimated trapped amount PM is substantially equal to the amount of trapped particulate matter PMZ (i.e., PM≈PMZ), the process jumps from step 234$a$ to step 229 in FIG. 13. In this case, the estimated trapped amount PM is not corrected, and the correction coefficient KPMi is not updated.

Therefore, when comprehensively describing the second and third example embodiments of the invention, the estimated trapped amount PM is corrected based on the reference temperature TFRF and the actual temperature TFAC until the reference temperature increase control is cancelled, when the reference temperature increase control is cancelled.

As can be understood from the description thus far, the actual initial trapped amount PM0Z is accurately represented by both the actual removed amount PMRZ and the increased rate of increase vTFAC1 of the actual temperature TFAC. However, the inventors of this invention confirmed that the actual initial trapped amount PM0Z is more accurately represented by the actual removed amount PMRZ than by the rate of increase vTFAC1 of the actual temperature TFAC when the set rate vTFACX was exceeded. Thus, in the third example embodiment of the invention, the estimated trapped amount PM is corrected based on the actual removed amount PMRZ, and is corrected based on the rate of increase vTFAC1 only when the reference temperature increase control has been cancelled, i.e., only when the actual removed amount PMRZ is unable to be calculated.

Figure 18:
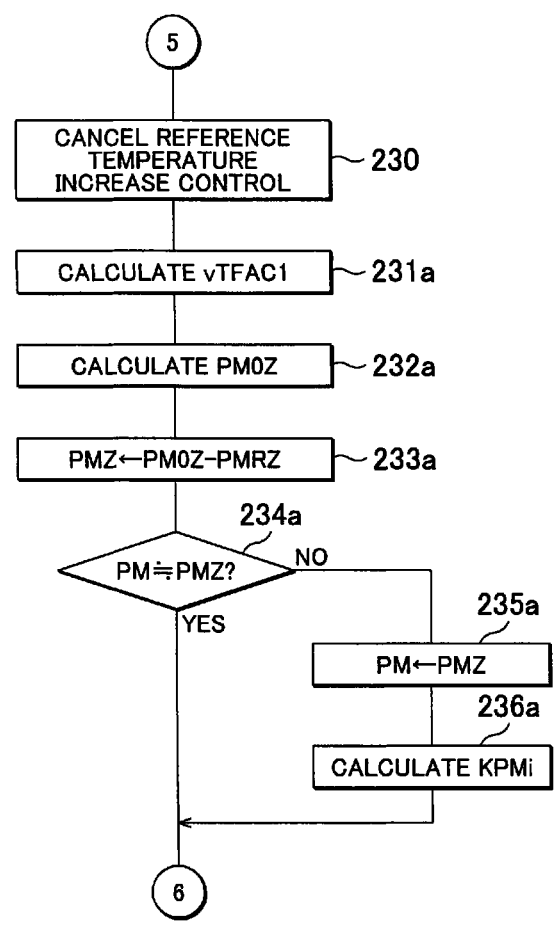
FIG. 18 is a flowchart that corresponds to FIG. 14 of the first example embodiment and illustrates a routine for executing exhaust gas purifying control according to the third example embodiment of the invention.
Figure 20:
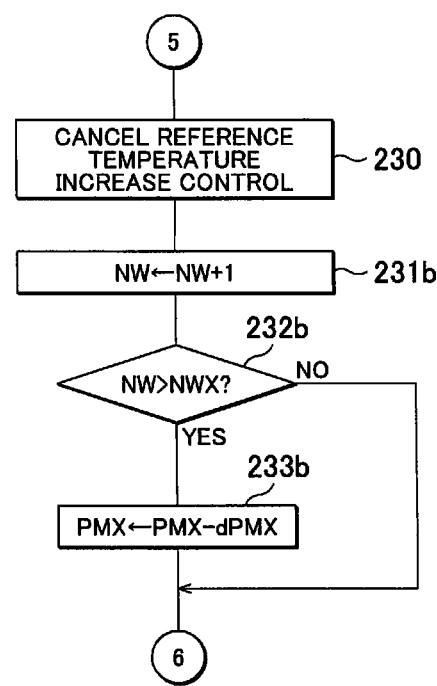
FIG. 20 is a flowchart of a portion of the routine for executing exhaust gas purifying control according to the fourth example embodiment.

In the routine illustrated in FIG. 18, although a description is omitted, the rate of increase vTFAC1 is unable to be obtained when the reference temperature increase control is cancelled before the rate of increase vTFAC of the actual temperature TFAC exceeds the set rate vTFACX, so the actual initial trapped amount PM0Z based on the rate of increase vTFAC1 is not calculated. In this case, the estimated trapped amount PM at the point when the reference temperature increase control is cancelled is corrected to the difference of the estimated initial trapped amount PM0 minus the actual removed amount PMRZ at the point when the reference temperature increase control was cancelled (i.e., PM0−PMRZ), as in the second example embodiment of the invention.

Next, a fourth example embodiment of the invention will be described. Hereinafter, the differences from the first example embodiment of the invention described above will be described. In the first example embodiment of the invention, the estimated trapped amount PM is not corrected when the reference temperature increase control is cancelled, which is not preferable. Here, the reason for the reference temperature increase control being cancelled is because it is determined that the particulate filter 15 is not in the reference until the set amount PMX of particulate matter is removed by the reference temperature increase control. Thus, by shortening the period of time required to complete the reference temperature increase control, cancellation of the reference temperature increase control is able to be reduced. Regarding this, if the set amount PMX is reduced, the period of time required to complete the reference temperature increase control is able to be shortened.

Thus, in the fourth example embodiment of the invention, when the number of times NW that the reference temperature increase control has been cancelled (i.e., the number of cancellations NW of the reference temperature increase control) exceeds an upper limit number of times NWX, the set amount PMX is reduced by a small set amount dPMX, for example. As a result, the reference temperature increase control is more easily completed, so the estimated trapped amount PM can be reliably corrected.

That is, as shown in FIG. 19, the reference temperature increase control is started when the estimated trapped amount PM exceeds the set amount PMX at time tf1. Next, when it is determined that the particulate filter 15 is not in the reference state at time tf2, the reference temperature increase control is cancelled. Also, the number of cancellations NW of the reference temperature increase control is incremented by 1. As a result, the number of cancellations NW exceeds the set number of times NWX. At this time, the set amount PMX is reduced by the small set amount dPMX. Next, the estimated trapped amount PM again exceeds the set amount PMX at time tf3. At this time, it is determined that the particulate filter 15 is not in the reference state, so the reference temperature increase control is not started.

In the fourth example embodiment of the invention, the routine illustrated in FIGS. 11 to 13 and FIG. 20 is executed. That is, when it is determined that the particulate filter 15 is not in the reference state while the reference temperature increase control is being performed, the process proceeds from step 222 in FIG. 13 on to step 230 in FIG. 20, where the reference temperature increase control is cancelled. Then in step 231$b$, the number of cancellations NW of the reference temperature increase control is incremented by 1. Next in step 232$b$, it is determined whether the number of cancellations NW has exceeded the upper limit number of times NWX. If NW≤NWX, the process proceeds on to step 229 in FIG. 13. On the other hand, if NW>NWX, the process then proceeds on to step 233$b$, where the set amount PMX is reduced by the set amount dPMX (PMX=PMX−dPMX). Then the process proceeds on to step 229 in FIG. 13.

In the example embodiments described thus far, the reference temperature increase control is performed while the engine is idling. In another example that is not shown, a secondary air supplier capable of supplying secondary air into the exhaust passage upstream of the particulate filter 15 is provided, and the reference temperature increase control is performed while supplying a certain amount of air to the particulate filter 15 by the secondary air supplier while the engine is stopped. As a result, the reference state is maintained, so the reference temperature increase control will not be cancelled. That is, the reference temperature increase control is reliably completed. Thus, the estimated trapped amount PM is able to be reliably corrected.

Also, in the example embodiments described thus far, the reference state is a steady state. In another example that is not shown, the reference state is a transient state. In this case, the temperature of the particulate filter when the amount of gas that flows into the particulate filter 15 fluctuates according to a predetermined pattern, for example, is obtained beforehand as a reference temperature. In the reference temperature increase control, the temperature of the particulate filter 15 is increased when the amount of gas that flows into the particulate filter 15 fluctuates according to the foregoing pattern.

Moreover, in the example embodiments described thus far, all of the increase amounts dPMi shown in the form of dots in FIG. 4 are corrected. However, depending on the engine operating history, there may be cases in which only some of the increase amounts dPMi, e.g., the increase amounts dPMi in region C in FIG. 21, are used, and the increase amounts dPMi outside of the region C are not used, to calculate the estimated trapped amount PM according to Expression (1). Therefore, in another example of the invention, only the increase amounts dPMi used to calculate the estimated trapped amount PM are corrected, and the other increase amounts dPMi are not corrected. As a result, the estimated trapped amount PM is able to be inhibited from being erroneously corrected.

In the example embodiments described thus far, the estimated trapped amount PM is corrected using the correction coefficient KPMi calculated based on the actual temperature TFAC and the reference temperature TFRF. Retarding this, it is also conceivable to calculate the estimated trapped amount PM based on the actual temperature TFAC and the reference temperature TFRF. Also, the estimated trapped amount PM at the point when the reference temperature increase control was cancelled is calculated based on the actual removed amount PMRZ in the second example embodiment of the invention, and calculated based on the actual removed amount PMRZ and the actual initial trapped amount in the third example embodiment of the invention. As a result, it is also conceivable to calculate the estimated trapped amount PM at the point when the reference temperature increase control was cancelled, based on the actual temperature TFAC and the reference temperature TFRF.

The invention claimed is:

1. An exhaust gas control apparatus of an internal combustion engine, the exhaust gas control apparatus comprising:
    a particulate filter configured to trap particulate matter in exhaust gas that is discharged from the internal combustion engine, the particulate filter being arranged inside an exhaust passage of the internal combustion engine; and
    an electronic control unit configured to:
        i) calculate an estimated trapped amount based on an operating state of the internal combustion engine or a differential pressure before and after the particulate filter, the estimated trapped amount being an estimated value of an amount of the particulate matter, and the particulate matter being trapped in the particulate filter,
        ii) perform reference temperature increase control that increases a temperature of the particulate filter based on a predetermined reference state in order to remove the particulate matter trapped in the particulate filter,
        iii) detect an actual temperature that is the temperature of the particulate filter while the reference temperature increase control is being performed,
        iv) store, in advance, a reference temperature that is the temperature of the particulate filter when it is assumed that the reference temperature increase control has been performed when the amount of the particulate matter trapped in the particulate filter is a predetermined reference initial trapped amount,
        v) correct the estimated trapped amount based on the actual temperature and the reference temperature, and
        vi) perform particulate matter removal control that removes the particulate matter from the particulate filter, when the estimated trapped amount exceeds a predetermined upper limit amount.

2. The exhaust gas control apparatus according to claim 1, wherein
    the electronic control unit is configured to correct the estimated trapped amount based on a ratio of the actual temperature to the reference temperature, or a difference between the actual temperature and the reference temperature.

3. The exhaust gas control apparatus according to claim 1, wherein
    the electronic control unit is configured to
        i) store an estimated initial trapped amount, the estimated initial trapped amount being the estimated trapped amount when the reference temperature increase control is started,
        ii) calculate, based on the actual temperature and the reference temperature, an actual removed amount that is an amount of particulate matter actually removed from the particulate filter by the reference temperature increase control, and
        iii) correct the estimated trapped amount based on a ratio of the actual removed amount to the estimated initial trapped amount, or a difference between the actual removed amount and the estimated initial trapped amount.

4. The exhaust gas control apparatus according to claim 1, wherein
    the electronic control unit is configured to set the reference initial trapped amount to substantially zero.

5. The exhaust gas control apparatus according to claim 1, wherein
    the electronic control unit is configured to
        i) repeatedly calculate, based on the operating state of the internal combustion engine, increase amounts per unit time of the amount of particulate matter trapped in the particulate filter,
        ii) calculate the estimated trapped amount by integrating the increase amounts, and
        iii) correct the estimated trapped amount by correcting the increase amounts based on the actual temperature and the reference temperature.

6. The exhaust gas control apparatus according to claim 1, wherein
    the electronic control unit is configured to start the reference temperature increase control when the estimated trapped amount exceeds a set amount, the set amount being set smaller than the upper limit amount.

7. The exhaust gas control apparatus according to claim 1, wherein the electronic control unit is configured to complete the reference temperature increase control when the actual temperature substantially matches the reference temperature.

8. The exhaust gas control apparatus according to claim 7, wherein
the electronic control unit is configured to correct the estimated trapped amount to the reference initial trapped amount, when the reference temperature increase control is completed.

9. The exhaust gas control apparatus according to claim 1, wherein
the electronic control unit is configured to cancel the reference temperature increase control when the electronic control unit determines that the particulate filter is not in the reference state while the reference temperature increase control is being performed.

10. The exhaust gas control apparatus according to claim 9, wherein
the electronic control unit is configured to correct the estimated trapped amount at the point when the reference temperature increase control is cancelled, based on the reference temperature and the actual temperature until the reference temperature increase control is cancelled, when the reference temperature increase control is cancelled.

11. The exhaust gas control apparatus according to claim 9, wherein
the electronic control unit is configured to correct the estimated trapped amount based on a rate of increase of the temperature of the particulate filter when the rate of increase exceeds a predetermined set rate, after the reference temperature increase control is started.

12. The exhaust gas control apparatus according to claim 9, wherein
the electronic control unit is configured to
i) complete the reference temperature increase control when the reference temperature increase control is started and the actual temperature substantially matches the reference temperature, when the estimated trapped amount exceeds a set amount, the set amount being set smaller than the upper limit amount, and
ii) reduce the set amount when the number of times that the reference temperature increase control is cancelled exceeds the predetermined upper limit number of times.

13. The exhaust gas control apparatus according to claim 1, wherein
the reference state is a steady state.

14. The exhaust gas control apparatus according to claim 13, wherein
the reference state is a steady state in which an amount of gas is less than a predetermined set gas amount, the gas flowing into the particulate filter.

15. The exhaust gas control apparatus according to claim 1, further comprising:
a temperature increaser configured to increase the temperature of the particulate filter without changing control of the internal combustion engine,
wherein the exhaust gas control apparatus is configured to use the temperature increaser to perform the reference temperature increase control.

16. The exhaust gas control apparatus according to claim 15, further comprising:
an electric heater that is provided in the temperature increaser, and the electric heater is provided inside of the exhaust passage upstream of the particulate filter or inside of the particulate filter.

17. An exhaust gas control apparatus of an internal combustion engine, the exhaust gas control apparatus comprising:
a particulate filter configured to trap particulate matter in exhaust gas that is discharged from the internal combustion engine, the particulate filter being arranged inside an exhaust passage of the internal combustion engine;
an electronic control unit configured to:
i) perform reference temperature increase control that increases a temperature of the particulate filter based on a predetermined reference state in order to remove the particulate matter trapped in the particulate filter,
ii) detect an actual temperature that is the temperature of the particulate filter while the reference temperature increase control is being performed,
iii) store, in advance, a reference temperature that is the temperature of the particulate filter when it is assumed that the reference temperature increase control has been performed when an amount of the particulate matter trapped in the particulate filter is a predetermined reference initial trapped amount,
iv) calculate an estimated trapped amount based on the actual temperature and the reference temperature, the estimated trapped amount being an estimated value of the amount of the particulate matter trapped in the particulate filter, and
v) perform particulate matter removal control that removes the particulate matter from the particulate filter, when the estimated trapped amount exceeds a predetermined upper limit amount.

* * * * *